Jan. 26, 1932.  B. KRÄMER  1,842,788
FLUID CONTROLLING DEVICE
Filed March 4, 1930
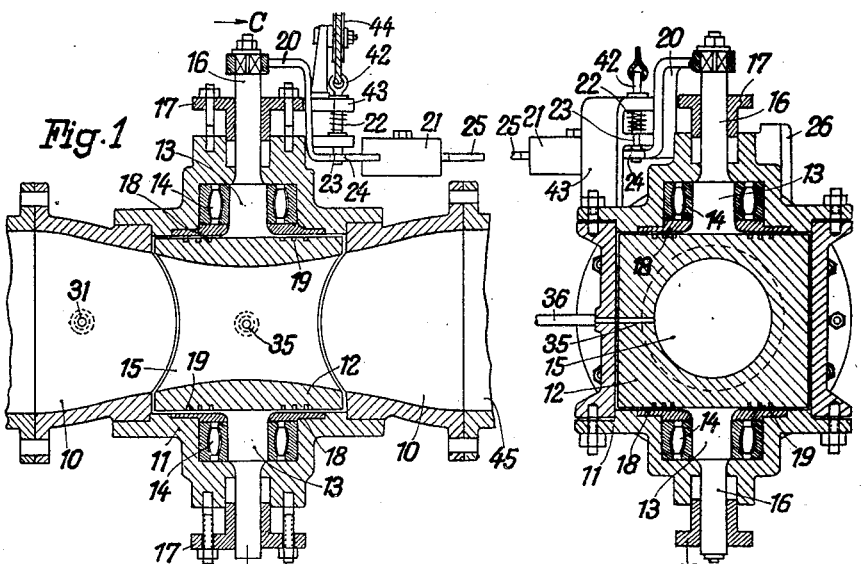
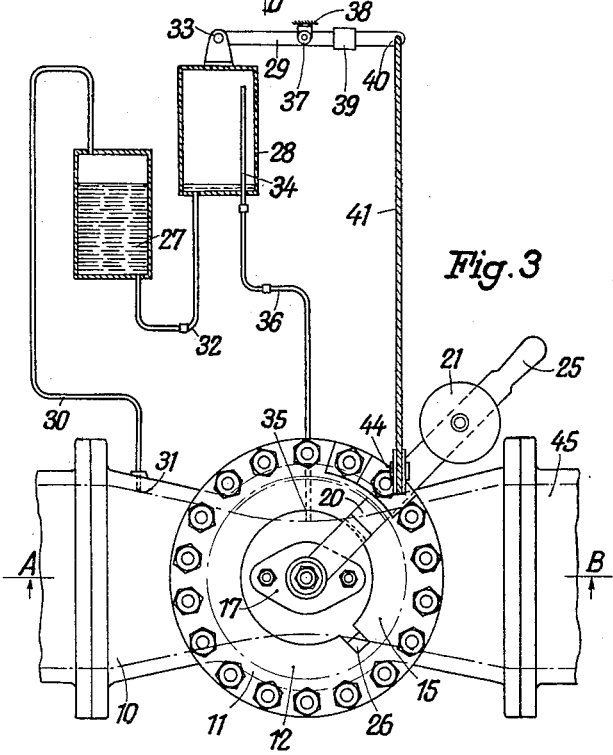
Inventor:
Bernhard KRÄMER.
By: Chatwin & Company
attys.

Patented Jan. 26, 1932

1,842,788

UNITED STATES PATENT OFFICE

BERNHARD KRÄMER, OF HALLE, GERMANY

FLUID CONTROLLING DEVICE

Original application filed November 28, 1928, Serial No. 322,536, and in Germany November 28, 1927. Divided and this application filed March 4, 1930. Serial No. 433,141.

This invention relates to a valve for steam conduits and the like and of the kind comprising a cock plug which is supported in a valve casing by means of co-axial spindles and by balls or barrel rollers engaging said spindles so as to be itself maintained out of actual contact with the casing and allow of being easily turned for the rapid, though incomplete closing of the conduit in case of pipe fracture, casing and plug forming together a Venturi passage.

This application is a division of application No. 322,536, filed Nov. 28, 1928.

The invention consists in providing the valve with means, controlled by the pressure difference in different parts of the Venturi passage for closing the valve automatically in case of pipe fracture.

Fig. 1 of the accompanying drawings represents a longitudinal horizontal section of the valve taken on the line A—B of Fig. 3. Fig. 2 is a section on the line C—D of Fig. 1 and Fig. 3 is a side view of the valve and the closing device.

The cock casing 11 is fitted with a cock plug 12 which is supported in the casing by means of two coaxial spindles 13 and by means of balls or barrel rollers 14. The plug is mounted in the casing with sufficient clearance, say about 0.5 mm. to allow of being freely movable but without passing, when in its closed position, any material quantity of fluid. Thus the cock can be easily closed and will, in the case of steam pipe fracture, prevent the boiler from being exhausted, or the attendants from being scalded.

The plug 12 is provided with a steam passage 15 like a Venturi pipe, and the casing 11 is fitted with annular connecting members 10 which adjoin the plug passage and which, like the latter, are flared outwards for connection to the conduit 45.

The bearing plates 18 at opposite ends of the plug 12 are tightened to the latter by means of labyrinth packings 18.

The spindles 13 are formed with extensions 16 which pass through tightening glands 17. One of said extensions is squared for the reception of a lever 20 which carries at its free end 25 an adjustable weight 21. The latter tends to maintain the horizontally-arranged valve in its closed position which is determined by the abutment of the lever 20 against a stop 26 on the casing. For maintaining the valve in open position, a bolt 23 is provided which is guided in brackets 43 on the casing and controlled by a spring 22 whereby it is held in engagement with an aperture 24 in the lever 20. The bolt 23 is eyed for connection to a cable 41 which is guided over a sheave 44 and connected at its opposite end to a double-armed lever 29. The latter is arranged to rock about a pivot 37 connected to a support 38. On the end of the lever 29 opposite the cable 40 a closed vessel 28 is suspended by means of a pivot 33. This vessel communicates, through a flexible pipe 32 with another closed vessel 27 which is rigidly supported and which is charged with mercury or other suitable liquid the communication between the two vessels being at the bottom so that the mercury can be transferred from one to the other. A pipe 30, which communicates with the upper portion of the vessel 27, opens at 31 into one of the rings 10 so as to communicate the pressure in the conduit to the two vessels. The vessel 28 encloses a rigid pipe 34 which rises from the bottom thereof and which is connected by means of a flexible pipe to a rigid pipe 36. The latter opens at 35 into the narrowest portion of the valve passage. The vessel 29 is counter-balanced by a weight 39 so that under normal conditions the bolt 23 will be maintained by the spring 22 in engagement with the lever 20.

In the arrangement shewn, the fluid is supposed to pass through the valve casing from left to right. Owing to the contraction of the valve passage, the pressure at the point 31 will be greater than at the point 35. In case of pipe fracture at the right side of the valve, the pressure difference will be increased, and liquid will be forced from the vessel 27 into the vessel 28 so as to add weight to the latter and cause the lever 29 to trip in opposition to the cable, the bolt 23 releases the lever 20 and allows the weight 21 to close the valve.

The same closing operation of the valve will take place in the case of a pipe fracture at the left side of the casing so as to cut off, say, a boiler at the right side of the valve when the latter is arranged in a conduit which connects two boilers.

Naturally the bolt 23 can also be withdrawn by hand for rleasing the closing arm.

The device can also be used for reducing to a given extent the supply of driving fluid to a machine.

I claim:—

1. The combination with a valve of the kind referred to, of means, controlled by the pressure difference, at different points of the Venturi passage, for closing the valve automatically in case of pipe fracture, comprising a weighted lever secured to the valve spindle and tending to close the valve, a spring controlled detent for retaining the valve normally in open position, a pair of communicating vessels charged with mercury or the like and connected to valve casing, one at a narrow and the other at a wide part of the Venturi passage so that liquid will be forced from one vessel into the other owing to the increase in the pressure difference in case of a pipe fracture, one of said vessels being suspended from one end of a weight-balanced double-armed lever so as to cause the latter to trip on a change in the gravity due to the transfer of liquid from one vessel to the other, the lever being connected to said detent so as to release the valve when the lever is tripped.

2. A control device for fluids comprising a casing, connections fitting in said casing, a valve plug mounted within said casing, a spindle carried by said plug, a control arm carried by said spindle, a counterbalanced lever, a spring influenced stud carried by the casing for engagement with the control arm, means connecting said stud with one end of said counterbalanced lever and means for moving the other end of said counterbalanced lever for withdrawing said stop to release the control arm on increase of pressure in said connection.

3. In a control device for fluids, a casing, tapered connections fitting in said casing, a valve plug mounted within said casing, a spindle carried by said plug, a control arm fixed with said spindle, means for locking the movement of the control arm, a fixed vessel containing mercury, a fluid connection between said vessel and said tapered connection, a counterbalanced lever, a vessel carried by one end of said counterbalanced lever, a flexible connection between the fixed and movable vessel and the valve casing, means for connecting the counterbalanced lever with said locking means and a stop for limiting the movement of the control arm, the arrangement being such that upon an accident occurring an increased pressure forces the mercury from the fixed vessel to the movable vessel, oscillates the lever and releases the stop mechanism.

BERNHARD KRÄMER.

CERTIFICATE OF CORRECTION.

Patent No. 1,842,788. January 26, 1932.

BERNHARD KRÄMER.

It is hereby certified that the above numbered patent was erroneously issued to the inventor said "Krämer" whereas said patent should have been issued to "the firm Elektrowerke Aktiengesellschaft, of Berlin, Germany", as assignee of the entire interest in said invention, as shown by the records of assignments in this office; and that the said Letters Patent should be read with this correction therein that the same may conform to the record of the case in the Patent Office.

Signed and sealed this 24th day of January, A. D. 1933.

(Seal)

M. J. Moore,
Acting Commissioner of Patents.